US 7,917,107 B2
Mar. 29, 2011

(12) United States Patent
Gu et al.

(10) Patent No.: US 7,917,107 B2
(45) Date of Patent: Mar. 29, 2011

(54) ANTENNA SELECTION WITH RF IMBALANCE

(75) Inventors: Daqing Gu, Burlington, MA (US); Andreas F. Molisch, Arlington, MA (US); Jinyun Zhang, Cambridge, MA (US); Hongyuan Zhang, Raleigh, NC (US); Dong Wang, Newark, DE (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1406 days.

(21) Appl. No.: 11/387,252

(22) Filed: Mar. 23, 2006

(65) Prior Publication Data
US 2007/0224943 A1 Sep. 27, 2007

(51) Int. Cl.
H04B 7/08 (2006.01)
(52) U.S. Cl. .......................... 455/132; 455/140; 375/347
(58) Field of Classification Search .................. 455/41.1, 455/69, 101, 562.1, 277.1, 78, 103, 132, 455/140; 235/380, 462.46; 375/299, 261, 375/267, 347; 370/203, 208, 319, 344
See application file for complete search history.

(56) References Cited
U.S. PATENT DOCUMENTS
6,804,312 B1 * 10/2004 Win et al. ..................... 375/347

FOREIGN PATENT DOCUMENTS
WO WO 03/034614 4/2003
WO WO 2005/034387 4/2005
WO WO 2005/034387 A2 * 4/2005

OTHER PUBLICATIONS
Molisch et al. "MIMO Systems with Antenna Selection," Mar. 2004.
* cited by examiner Primary Examiner — Nay Maung
Assistant Examiner — Angelica M Perez
(74) Attorney, Agent, or Firm — Dirk Brinkman; Gene Vinokur

(57) ABSTRACT

A method for selecting antennas in a multiple-input, multiple-output wireless communications network that includes multiple stations is presented. Each station includes a set of transmit RF chains and a set of receive RF chains, and each RF chain is connectable to a set of antennas. A first station transmits a training frame for each possible subset of the set of antennas, and the set of transmit RF chains are connected to the subset of antennas according to a connection mapping rule while transmitting each training frame. A subchannel matrix is estimated in a second station for each frame. The subchannel matrices are combined to obtain a complete channel matrix. A particular subset of the antennas is selected according to the complete channel matrix. The set of transmit RF chains is connected to the selected particular subset of antennas to transmit data from the first station to the second station.

9 Claims, 4 Drawing Sheets

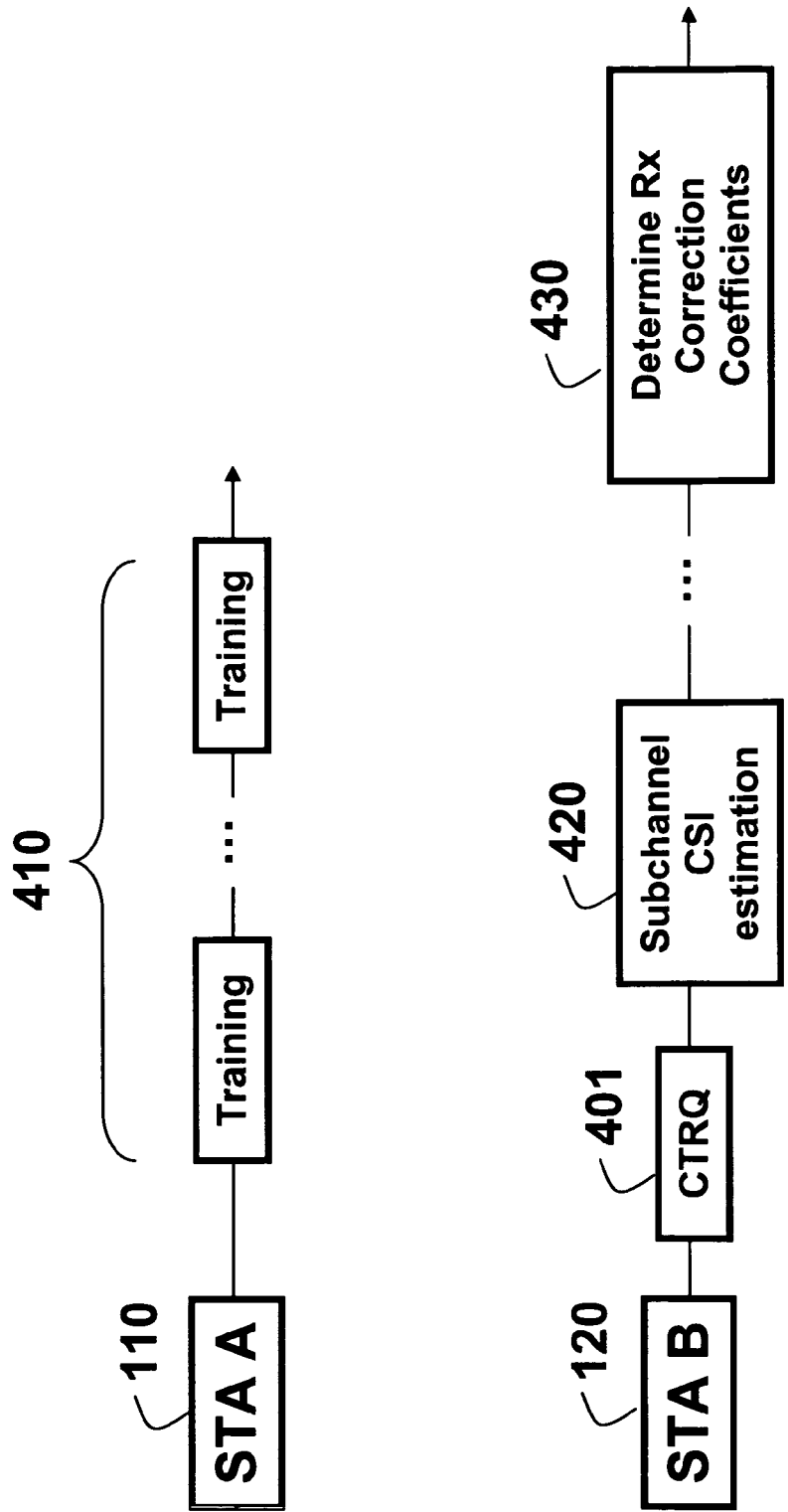

US 7,917,107 B2

ANTENNA SELECTION WITH RF IMBALANCE

FIELD OF THE INVENTION

This invention relates generally to multiple-input, multiple-output (MIMO), wireless communication systems, and more particularly to selecting antennas in MIMO systems.

BACKGROUND OF THE INVENTION

Multiple-input, multiple-output (MIMO) techniques can significantly increase system capacity in a scattering environment of a wireless network. However, multiple antennas increases hardware complexity and cost because, in a typical system, each transmit/receive antenna requires a separate radio frequency (RF) chain including a modulator/demodulator, an AD/DA converter, an up/down converter, and a power amplifier. In addition, the processing complexity at the baseband also increases with the number of antennas.

Antenna selection (AS) can reduce the number of RF chains while still taking advantage of the capacity/diversity increase provided by multiple antennas. The idea is to select a submatrix from a complete channel matrix according to some predetermined criterion. To perform antenna selection, the complete channel matrix is estimated by sending training frames to measure the complete channel state information (CSI). The training frames can be sent in the same physical layer packet or by multiple packets.

Conventionally, on transmitting or receiving these AS training frames, the device conducting antenna selection switches different antenna subsets to the RF chains and estimates the corresponding subchannels matrices. The selection is based on the complete channel matrix composed of the estimated subchannels matrices.

However, conventional antenna selection schemes ignore the fact that each possible connection of a RF chain to an antenna introduces one unique RF response containing the effects of both amplitude gain and phase shift. As a result, in some circumstances, distortions are inevitable for antenna selection, because the selected antennas used for data transmission and reception may be connected to RF chains different from those used during training.

In the data transmission phase, the actual channel associated with the selected antennas may not be identical to that used in the training phase. This phenomenon is known as a RF imbalance problem.

It is desired to correct the RF imbalance problem in MIMO systems.

SUMMARY OF THE INVENTION

The embodiments of the invention provide solutions for antenna selection that reduce an RF imbalance problem. A first solution trains with all possible antenna subsets, instead of the disjointed subsets as in conventional schemes. To avoid large overhead, a second solution defines calibration procedures to correct the distortion.

BRIEF DESCRIPTION OF THE DRAWINGS

FIG. 4 is a block diagram of training and calibration initiated by a receive station.

DETAILED DESCRIPTION OF THE PREFERRED EMBODIMENT

System Overview

Figure 1:
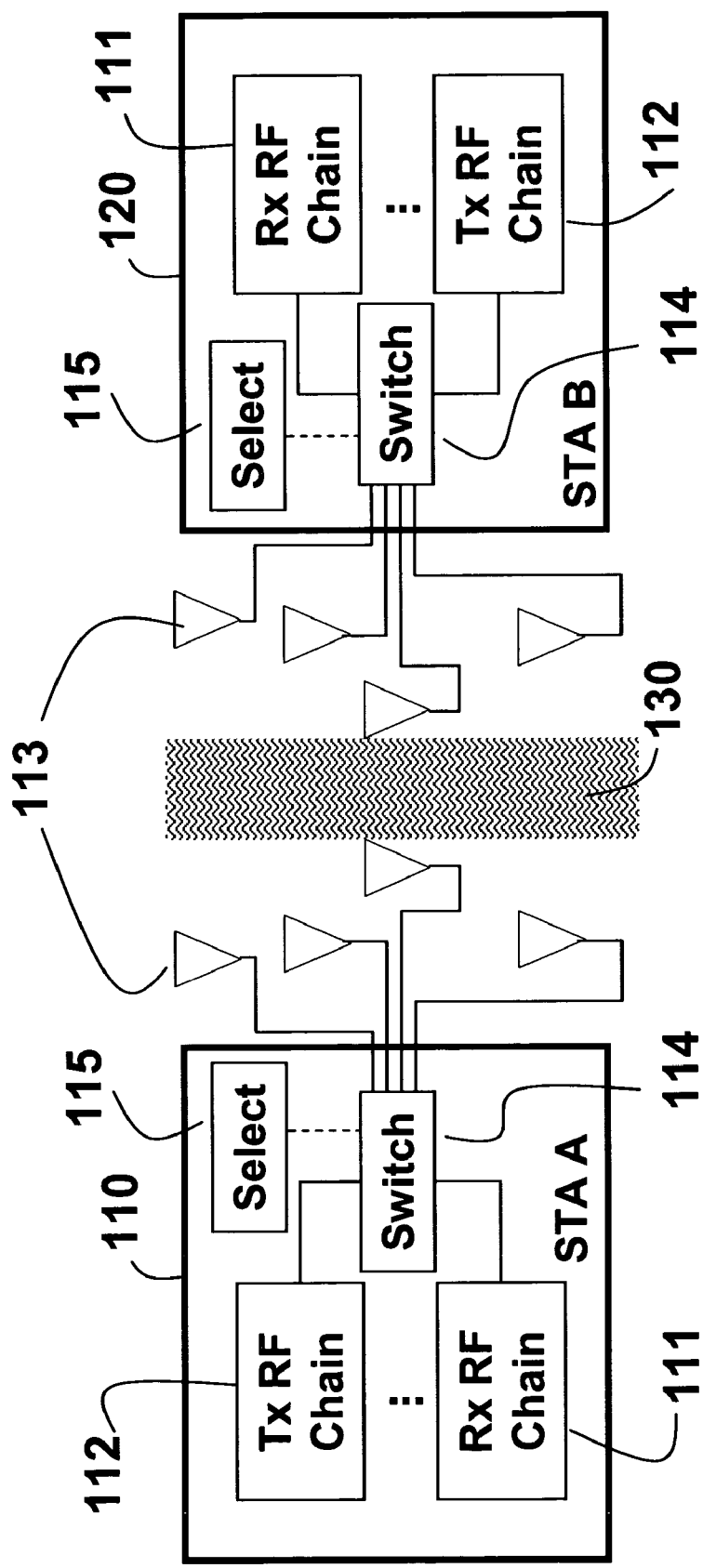
FIG. 1 is a block diagram of a MIMO system according to an embodiment of the invention.

FIG. 1 shows a MIMO communication system according to an embodiment of the invention. The system includes a first station (STA A) 110, a second station (STA B) 120, and wireless channels 130. Either station can operate in receive or transmit mode. Generally, the station that transmits data is called the transmit station or transmitter, and the station that receives the data is called the receive station or receiver. The data are transmitted and received using a baseband signal.

Hereinafter, a 'set' is defined as including one or more elements; the number of elements in a 'subset' is equal to or less than the number of elements in the corresponding set.

Each station includes a set of receive (Rx) RF chains 111 and a set of transmit (Tx) RF chains 112, both connected to a set of antennas 113 by switches 114. Generally, in MIMO devices, the number of antennas is larger than the number of RF chains. Therefore, a subset of antennas is selected 115 from the set of total available antennas by a method according to an embodiment of the invention during an antenna selection (AS) training phase as described herein. The selection method can be initiated by either the transmitter or the receiver, and the selection can be conducted at the transmitter and/or at the receiver.

Association Phase

During an initial association phase, not shown, the stations exchange information about the number of RF chains, the number of antennas, and the type of antenna selection. In particular, the type of information contained in a feedback packet, e.g., whether information is indices of the antennas to be used, and/or a full (instantaneous) channel state information (CSI), and/or an average channel state information is transmitted during that time or, alternatively, as part of the feedback packet.

Training and Data Transmission Phases

Figure 2:
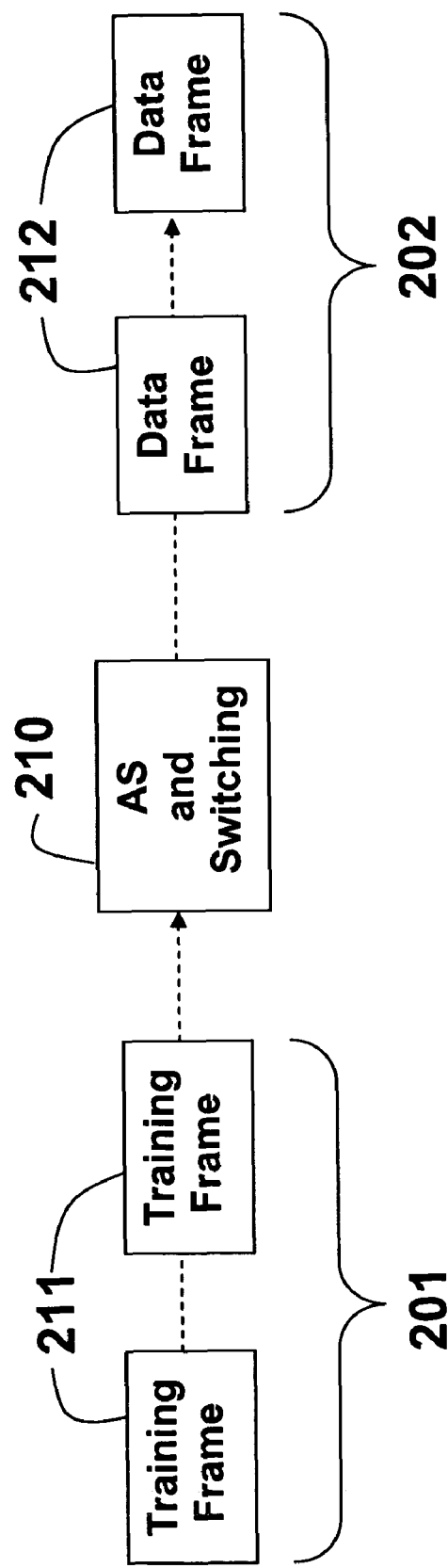
FIG. 2 is a block diagram of an antenna selection cycle according to an embodiment of the invention.

As shown generally in FIG. 2, each AS training cycle is composed of an antenna selection training phase 201 and a data transmission phase 202. The cycle can be repeated periodically, or as the channel environment changes. Several AS training frames 211 are transmitted in each AS training phase 201. Each of the frames is transmitted from and/or received by one subset of antennas to be selected. The antenna selection 210 is based on a complete channel matrix. The complete channel matrix is estimated from a combination of the subchannel matrices estimated from the AS training frames 211. The selected antennas are connected to the RF chains by the switches 114 before the data frames 212 are transmitted during the data transmission phase 202. Another antenna selection cycle can be initiated when the current selected antenna subset is outdated, or when a predetermined time interval has elapsed.

System Model for MIMO Systems with Antenna Selection

In a MIMO system with conventional antenna selections, a transmit station A has a set of $N_A$ antennas with $N_{A\_SS}$ transmit RF chains, and a receive station B has a set of $N_B$ antennas with $N_{B\_SS}$ receive RF chains. In the data transmission phase 202, a relationship between a transmitted signal and a received signal in a flat-fading channel can be expressed as $$r_B = F_B^H(\tilde{H}_{A \to B} F_A s_A + n)$$

where $r_B$ is a $N_{B\_SS} \times 1$ received signal vector, $s_A$ is a $N_{A\_SS} \times 1$ transmitted signal vector, and $\tilde{H}_{A \rightarrow B}$ is a $N_B \times N_A$ equivalent channel matrix containing physical channel responses and an effect of transmit and receive RF responses.

A noise vector n has $N_B \times 1$ entries that are independent and identically distributed (i.i.d.) zero-mean circular complex Gaussian random variables with variance $N_0$. $F_A$ is a $N_A \times N_{A\_SS}$ transmit antenna selection matrix, and $F_B$ is a $N_B \times N_{B\_SS}$ receive antenna selection matrix. Both $F_A$ and $F_B$ are submatrices of an identity matrix. The equivalent channel matrix after antenna selection is a $N_{B\_SS} \times N_{A\_SS}$ matrix $H_{eq} = F_B^H \tilde{H}_{A \rightarrow B} F_A$, which is a submatrix of the channel matrix $\tilde{H}_{A \rightarrow B}$. The superscript 'H' means the conjugate transpose, which is used here for selection by the receiver.

The determination of $F_A$ and $F_B$ optimizes the capacity of the channel and the signal-to-noise ratio (SNR). If only one side antenna selection is considered, one of $F_A$ and $F_B$ equals the identity matrix, and the corresponding number of RF chains equals the number of antennas.

Antenna selection is performed by switching each output signal of a transmit RF chain to a selected transmit antenna, or each input signal of a selected receive antenna to a receive RF chain. The required number of RF chains to modulate/demodulate the transmitted/received signals is less than the total number of available transmit/receive antennas. Therefore, the cost of the system is reduced.

Conventional antenna selection schemes ignore the fact that the equivalent channel $\tilde{H}_{A \rightarrow B}$ in the data transmission phase contains the impact caused by RF responses. Specifically, $$\tilde{H}_{A \rightarrow B} = C_{B,Rx}(F_B) H_{A \rightarrow B} C_{A,Tx}(F_A),$$

where $H_{A \rightarrow B}$ is the actual propagation channel between the transmit antennas of STA A and the receive antennas of STA B. $C_{A,Tx}(F_A)$ is a $N_A \times N_A$ diagonal matrix whose $i^{th}$ diagonal element, $[C_{A,Tx}(F_A)]_{ii}$, collects the RF response corresponding to the $i^{th}$ transmit antenna, which is a function of the antenna selection matrix $F_A$.

If the $i^{th}$ row in $F_A$ contains all zeros, then the $i^{th}$ antenna is not selected, and $[C_{A,Tx}(F_A)]_{ii} = 0$. If an element at the $i^{th}$ row and $l^{th}$ column of $F_A$ is one, then the $i^{th}$ antenna is selected and is connected to the $l^{th}$ transmit RF chain during the data transmission phase. $[C_{A,Tx}(F_A)]_{ii} = \alpha_{li}^{(Tx)}$ is a complex number characterizing both the amplitude and phase shift of the RF response corresponding to the connection of transmit RF chain l and antenna i.

Therefore, in $C_{A,Tx}(F_A)$ there are $N_{A\_SS}$ non-zero diagonal elements. $C_{B,Rx}(F_B)$ is similarly defined as $[C_{B,Rx}(F_B)]_{jj} = \beta_{li}^{(Rx)}$ if the element at the $j^{th}$ row and $l^{th}$ column of $F_B$ is one.

In the $m^{th}$ conventional antenna selection training phase, a relationship between a transmitted signal and a received signal can be expressed as:

$$r_{B,t}(m) = T_B^H(m)(\tilde{H}_{A \rightarrow B} T_A(m) s_{A,t} + n),$$

where $s_{A,t}$ is a $N_{A\_SS} \times 1$ training vector known at both stations; $r_{B,t}$ is the $N_{B\_SS} \times 1$ received training vector at STA B; and $T_A(m)$ and $T_B(m)$ are the switching matrices in the $m^{th}$ AS training frame, whose values are predetermined, indicating the connections of the RF chains to the $m^{th}$ antenna subset. All these antenna subsets are exclusive with each other. For example, if $$N_A = 4 \times N_{A\_SS} = 2, N_B = 2, N_{A\_SS} = 2$$

and $$T_A(1) = \begin{bmatrix} 1 & 0 \\ 0 & 1 \\ 0 & 0 \\ 0 & 0 \end{bmatrix} \text{ and } T_A(2) = \begin{bmatrix} 0 & 0 \\ 0 & 0 \\ 1 & 0 \\ 0 & 1 \end{bmatrix},$$

then there are totally $$M = \lceil N_A / N_{A\_SS} \rceil \lceil N_B / N_{B\_SS} \rceil$$

training frames.

Then, STA B can estimate the complete channel matrix, which is used for AS computations, by combining the M subchannel matrices. Consequently, by ignoring channel estimation errors from training frame m, the estimated subchannel matrix is $$\tilde{H}'_{A \rightarrow B}(m) = T_B^H(m) C_{B,Rx}(T_B(m)) H_{A \rightarrow B} C_{A,Tx}(T_A(m)) T_A(m),$$

and the AS is based on the following estimated complete channel matrix:

$$\tilde{H}'_{A \rightarrow B} = C'_{B,Rx} H_{A \rightarrow B} C'_{A,Tx},$$

where the diagonal matrix $C'_{A,Tx}$ contains all non-zero diagonal elements, and $[C'_{A,Tx}]_{ii} = [C_{A,Tx}(T_A(m))]_{ii}$ if the $i^{th}$ antenna is trained by the $m^{th}$ training frame. Each antenna is trained only once, and $C'_{B,Rx}$ is similarly defined.

RF Imbalance

The antenna selection distortion caused by the RF imbalance can be described as follows. Antenna selection is based on the estimated complete matrix $\tilde{H}'_{A \rightarrow B}$, i.e., using a certain AS criteria X, the selection can be expressed as:

$$\{F_{A,opt}, F_{B,opt}\} = \underset{F_A, F_B}{\operatorname{argmax}} X(F_B^H \tilde{H}'_{A \rightarrow B} F_A).$$

There are $$N = \binom{N_A}{N_{A\_SS}} \binom{N_B}{N_{B\_SS}}$$

possible antenna subsets to be selected according to the above expression. However, if $F_{A,opt}, F_{B,opt}$ are selected in the data transmission phase, the equivalent channel becomes $$H_{eq} = F_{B,opt}^H C_{B,Rx}(F_{B,opt}) H_{A \rightarrow B} C_{A,Tx}(F_{A,opt}) F_{A,opt},$$

and $X(H_{eq})$ may not be optimal due to the differences between the RF responses in training phase and in data transmission phase. Therefore, the selection $\{F_{A,opt}, F_{B,opt}\}$ may, in fact, be suboptimal.

In the above example of $N_A = 4$, $N_{A\_SS} = 2$, $N_B = 2$, $N_{A\_SS} = 2$, i.e., only STA A conducts AS, $F_B = T_B = I$ so $C_{B,Rx}$ is always fixed. Then, the selection is based on $$\tilde{H}'_{A \to B} = C_B^{(Rx)} H_{A \to B} \begin{bmatrix} \alpha_{11}^{(Tx)} & & & \\ & \alpha_{22}^{(Tx)} & & \\ & & \alpha_{13}^{(Tx)} & \\ & & & \alpha_{24}^{(Tx)} \end{bmatrix}.$$

If antennas 1 and 3 are selected at STA A during data transmission phase, then $$\tilde{H}'_{A \to B} = C_B^{(Rx)} H_{A \to B} \begin{bmatrix} \alpha_{11}^{(Tx)} & & \\ & 0 & \\ & & \alpha_{23}^{(Tx)} \\ & & 0 \end{bmatrix}.$$

Obviously, there is a distortion caused by $\alpha_{13}^{(Tx)} \neq \alpha_{23}^{(Tx)}$, and transmit antennas 1 and 3 may not be the optimal selection.

RF Chain to Antenna Connection Mapping Rule

To improve the conventional selection process, we use the following connection mapping rule. The RF chains have corresponding RF chain indices and the antennas have corresponding antenna indices. For any selected antenna subset, the connection of RF chains to antennas is as follows. Without loss of generality, a RF chain with smaller RF chain index always connects to an antenna with smaller antenna index. For example, in the above example, if antennas 1 and 3 are selected at STA A, then transmit RF chain 1 is connected to antenna 1, and transmit RF chain 2 is connected to antenna 3.

According to the connection mapping rule, in the AS training phase 201 and the data transmission phase 202, there are a total of $N_{A\_SS} \times (N_A - N_{A\_SS} + 1)$ connections of RF chains and antenna subsets at STA A, and all the possible RF responses can be expressed as:

$$\begin{matrix} \alpha_{11}^{(Tx)} & \alpha_{22}^{(Tx)} & \cdots & \alpha_{N_{A\_SS}N_{A\_SS}}^{(Tx)} \\ \alpha_{12}^{(Tx)} & \alpha_{23}^{(Tx)} & \cdots & \alpha_{N_{A\_SS}(N_{A\_SS}+1)}^{(Tx)} \\ \vdots & \vdots & \ddots & \vdots \\ \alpha_{1(N_A-N_{a\_SS}+1)}^{(Tx)} & \alpha_{2(N_A-N_{a\_SS}+2)}^{(Tx)} & \cdots & \alpha_{N_{A\_SS}N_A}^{(Tx)} \end{matrix} \quad (1)$$

For example, in the above $N_A=4$, $N_{A\_SS}=2$ case, all possible RF responses include:

$\alpha_{11}^{(Tx)} \alpha_{22}^{(Tx)}$
$\alpha_{12}^{(Tx)} \alpha_{23}^{(Tx)}$
$\alpha_{13}^{(Tx)} \alpha_{12} a_{23}$
$\alpha_{13}^{(Tx)} \alpha_{24}^{(Tx)}$.

There are totally 2×3=6 possible values of $\alpha_{li}^{(Tx)}$. Note that the above connection mapping rule does not introduce any performance loss compared with conventional antenna selection schemes, which do not take RF responses into considerations.

Antenna Selection Considering RF Imbalance

One solution for the RF imbalance problem is to train all chains in combination with all possible subsets of antennas, instead of only disjoint subsets of antennas, as in the prior art. Consequently, in each AS training phase 201, there are N training frames, one for each possible subset of antennas connected to the transmit RF chains according to the above connection mapping rule. If the $m^{th}$ possible subset is selected, i.e., $F_{A,opt}=T_A(m)$, $F_{B,opt}=T(m)$, then, in both the training frame m and the data transmission phase, the estimated subchannel matrix is $$\tilde{H}'_{A \to B}(m) = T_B^H(m) C_{B,Rx}(T_B(m)) H_{A \to B} C_{A,Tx}(T_A(m)) T_A(m)$$
$$= F_{B,opt}^H \tilde{H}_{A \to B} F_{A,opt}.$$

Thus, there is no distortion between the AS training phase 201 and the data transmission phase 202. The drawback of this scheme is the increased training overhead because N>M.

Calibration for Antenna Selection

In addition, calibration can be performed to reduce the RF imbalance problem. The RF responses cannot always be determined because the RF responses vary with the environment over time, e.g., changes in frequency, temperature, etc. Therefore, an over-the-air calibration processes can be used. The overhead for calibration is small because the calibration processes can be conducted infrequently, e.g., only when the environment varies.

Calibration for Transmit Antenna Selection

Figure 3:
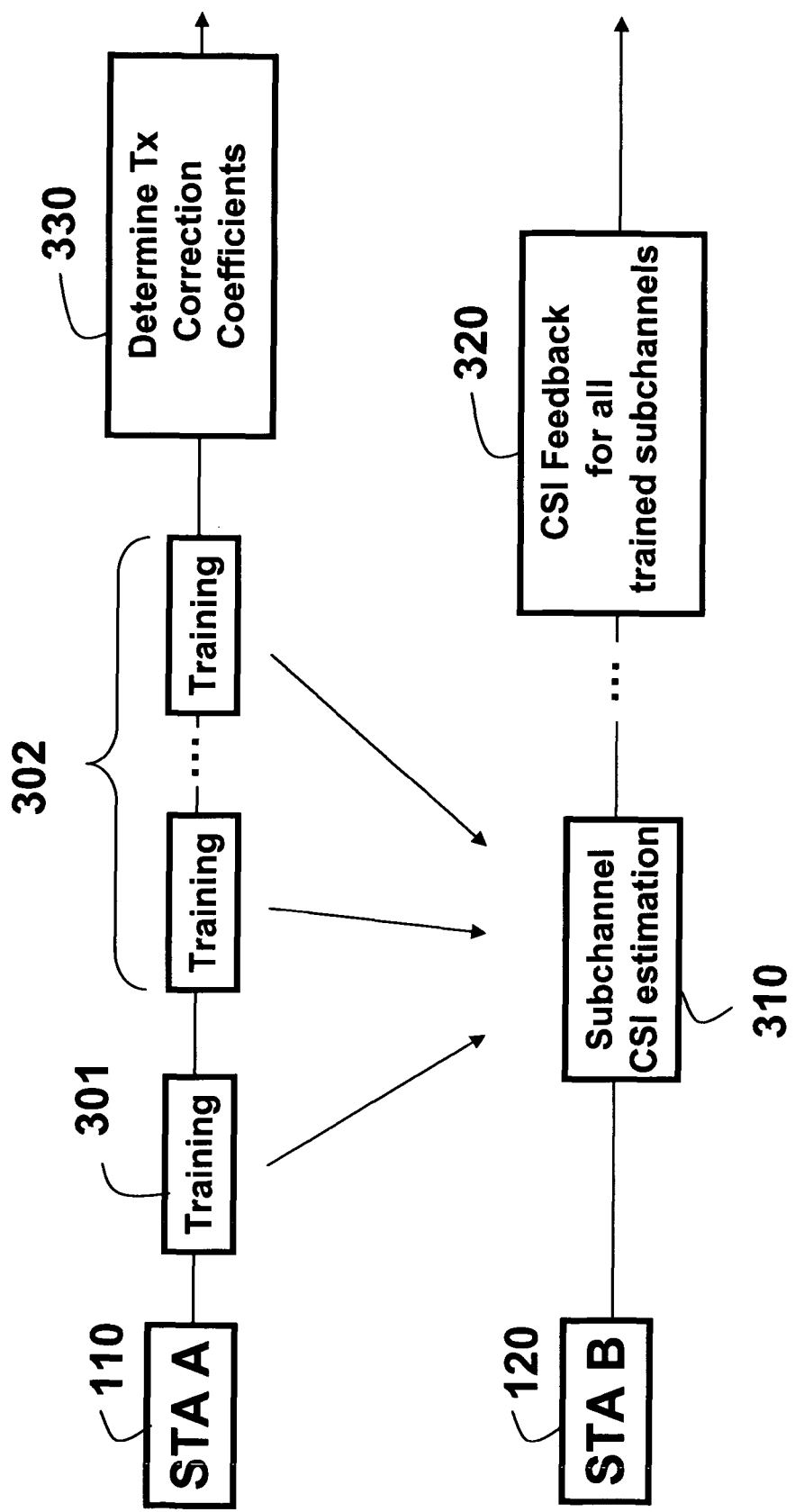
FIG. 3 is a block diagram of training and calibration initiated by a transmit station.

FIG. 3 shows the calibration procedure when the transmitter (STA A) conducts antenna selection. STA 110 sends a training frame 301 with the following transmit RF chain and antenna connections:

RF1→Ant1, RF2→Ant2, . . . , RFN$_{A\_SS}$→AntN$_{A\_SS}$, i.e., the transmit RF responses equal to the first row of expression (1). On receiving this training frame, STA B 120 estimates 310 the corresponding subchannel matrix $\hat{H}'_{A \to B}(1)$.

STA A sends the other $(N_A-N_{A\_SS})$ training frames 302, in each of which the connections of RF chains to antennas follows the corresponding row in expression (1). On receiving these training frames, STA B 120 estimates 310 the corresponding subchannel matrices $\hat{H}'_{A \to B}(2) \sim \hat{H}'_{A \to B}(N_A-N_{A\_SS}+1)$.

After receiving all the $(N_A-N_{A\_SS}+1)$ training frames 301-302, STA B feeds back 320 all the estimated subchannel matrices to STA A. STA A determines 330 RF imbalance TX correction coefficients based on all the estimated subchannel matrices fed back from STA B.

If $N_B > N_{B\_SS}$ and STA B also conducts receive antenna selection, on receiving all the $(N_A-N_{A\_SS}+1)$ training frames, STA B uses a predetermined subset of receive antennas, each connected to a predetermined receive RF chain.

The correction coefficients are determined as follows, by ignoring channel estimation errors, $$\tilde{H}'_{A \to B}(1) = \begin{bmatrix} \tilde{h}_{A \to B,11}^{(11)} & \tilde{h}_{A \to B,12}^{(22)} & \cdots & \tilde{h}_{A \to B,1N_{A\_SS}}^{(N_{A\_SS}N_{A\_SS})} \\ \tilde{h}_{A \to B,21}^{(11)} & \tilde{h}_{A \to B,22}^{(22)} & \cdots & \tilde{h}_{A \to B,2N_{A\_SS}}^{(N_{A\_SS}N_{A\_SS})} \\ \vdots & \vdots & \ddots & \vdots \\ \tilde{h}_{A \to B,N_{B\_SS}1}^{(11)} & \tilde{h}_{A \to B,N_{B\_SS}2}^{(22)} & \cdots & \tilde{h}_{A \to B,N_{B\_SS}N_{A\_SS}}^{(N_{A\_SS}N_{A\_SS})} \end{bmatrix},$$

where $\tilde{h}_{A \to B,n_B i}^{(li)} = \beta_{l_B n_B}^{(Rx)} h_{A \to B,n_B i} \alpha_{li}^{(Tx)}$ stands for the equivalent channel involving all the RF responses, and $h_{A \to B,n_B i}$ is the actual physical channel coefficient from transmit antenna i to receive antenna $n_B$ connected to receive RF chain $l_B$. Therefore, $\beta_{l_B n_B}^{(Rx)}$ is the corresponding receive RF response at STA B, and similarly $\alpha_{li}^{(Tx)}$ is the transmit RF response at STA A with the connection of transmit antenna i and transmit RF chain l. $\tilde{H}'_{A \to B}(2) \sim \tilde{H}'_{A \to B}(N_A-N_{A\_SS}+1)$ can be expressed similarly based on different transmit RF chain and antenna connections following the corresponding rows of the expression (1).

As in expression (1), in any case antenna 2 at STA A can only be connected to RF chain 1 or 2. Then, for a predetermined $n_B$, the following calculation can be conducted:

$$\kappa_{l2} = \frac{\tilde{h}_{A \to B, n_B 2}^{(12)}}{\tilde{h}_{A \to B, n_B 2}^{(12)}} = \frac{\beta_{l_B n_B}^{(Rx)} h_{A \to B, n_B 2} \alpha_{12}^{(Tx)}}{\beta_{l_B n_B}^{(Rx)} h_{A \to B, n_B 2} \alpha_{l2}^{(Tx)}} = \frac{\alpha_{12}^{(Tx)}}{\alpha_{l2}^{(Tx)}},$$

for l=1 and 2, and $k_{12}=1$. Then, $k_{12}$ is used as the correcting coefficient, which is multiplied on the baseband stream transmitted from the $l^{th}$ RF chain whenever the $l^{th}$ RF chain is connected to antenna 2. Therefore, any transmission from antenna 2 leads to a transmit RF response of $\alpha_{12}^{(TX)}$ at STA A in the AS training phase 201 and in the data transmission phase 202.

Similarly, for the $i^{th}$ transmit antenna:

$$\kappa_{li} = \frac{\tilde{h}_{A \to B, n_B i}^{(min\{L_i\}i)}}{\tilde{h}_{A \to B, n_B i}^{(li)}} = \frac{\alpha_{min\{L_i\}i}^{(Tx)}}{\alpha_{li}^{(Tx)}}, \text{ for } l \in L_i$$

where $L_i$ is the set of RF chain indices that are possible to be connected to antenna i as defined in expression (1). Then, $k_{li}$ is applied whenever RF chain l is connected to antenna i, and any transmission from antenna i leads to a corresponding transmit RF response of $\alpha_{min\{L_i\}i}^{(Tx)}$. As special cases, transmit antennas 1 and $N_A$ are always connected to RF chain 1 and $N_{A\_SS}$, respectively, so no correction is needed for antennas 1 and $N_A$. By doing the same calculations up to $I=N_A-1$ and by applying the results, at any time the equivalent complete channel matrix can be expressed as: $C_{B,Rx} H_{A \to B}$.

$$\tilde{H}_{A \to B} = diag\{\alpha_{11}^{(Tx)}, \alpha_{12}^{(Tx)}, \ldots, \alpha_{min\{L_i\}i}^{(Tx)}, \ldots, \alpha_{N_{A\_SS}N_A}^{(Tx)}\}$$

and there is no distortion between the AS training phase and the data transmission phase for STA. Note that these correction coefficients are applied in both the AS training phase and the data transmission phase, and is equivalent to replacing the ones in $F_A$ or $T_A(m)$ by the corresponding correction coefficients.

The above calculation can be repeated $N_{B\_SS}$ times, with $n_B=1 \ldots N_{B\_SS}$. The resultant $N_{B\_SS}$ sets of correction coefficients can then be averaged over a time period to reduce the impact from channel estimation errors.

Calibration for Receive Antenna Selection

FIG. 4 shows the calibration procedure when the receiver (STA B) 120 conducts antenna selection. All the possible receiver RF responses corresponding to the connections of receive RF chain and receive antennas are:

$$\begin{matrix} \beta_{11}^{(Rx)} & \beta_{22}^{(Rx)} & \cdots & \beta_{N_{B\_SS}N_{B\_SS}}^{(Rx)} \\ \beta_{12}^{(Rx)} & \beta_{23}^{(Rx)} & \cdots & \beta_{N_{B\_SS}(N_{B\_SS}+1)}^{(Rx)} \\ \vdots & \vdots & \ddots & \vdots \\ \beta_{1(N_B-N_{B\_SS}+1)}^{(Rx)} & \beta_{2(N_B-N_{B\_SS}+2)}^{(Rx)} & \cdots & \beta_{N_{B\_SS}N_B}^{(Rx)} \end{matrix} \quad (2)$$

STA B 120 sends a calibration training request (CTRQ) 401 to STA A 110, which contains the number of training frames 410 ($N_B-N_{B\_SS}+1$) the receiving station requires.

STA A responds by transmitting the ($N_B-N_{B\_SS}+1$) training frames 410 from a predetermined set of transmit antennas. STA B receives each training frame by using the receive RF chain and receive antenna connections defined in the corresponding row of expression (2), and estimates 420 the corresponding subchannel matrix.

After receiving all the ($N_B-N_{B\_SS}+1$) training frames 410, STA B 120 determines 430 the RF imbalance receive (Rx) correction coefficients based on all the estimated subchannel matrices. This determination is similar as for the transmit antenna selection case: for receive antenna j and for $l \in L_j$, $$\lambda_{lj} = \frac{\tilde{h}_{A \to B, jn_A}^{\prime(min\{L_j\}j)}}{\tilde{h}_{A \to B, jn_A}^{\prime(lj)}} = \frac{\beta_{min\{L_j\}j}^{(Rx)} h_{A \to B, jn_A} \alpha_{l_A n_A}^{(Tx)}}{\beta_{lj}^{(Rx)} h_{A \to B, jn_A} \alpha_{l_A n_A}^{(Tx)}} = \frac{\beta_{min\{L_j\}j}^{(Rx)}}{\beta_{lj}^{(Rx)}},$$

where $\tilde{h}'_{A \to B, jn_A}{}^{(lj)}$ is the estimated channel coefficient from any transmit antenna $n_A$ connected to transmit RF chain $l_A$ to receive antenna j corresponding to the connection of receive RF chain l to receive antenna j at STA B, and $L_j$ is the set of RF chain indices that are to be connected to antenna j as defined in expression (2). The correcting coefficient $\lambda_{lj}$ is multiplied on the baseband stream received by the $l^{th}$ receiving RF chain, whenever it is connected to antenna j at STA B, and consequently any reception by antenna j, in the AS training phase or in the data transmission phase, leads to a corresponding receive RF response of $\beta_{min\{L_j\}j}^{(Rx)}$. The equivalent complete channel matrix can be expressed as:

$$\tilde{H}_{A \to B} = \frac{diag\{\beta_{11}^{(Rx)}, \beta_{12}^{(Rx)}, \ldots, \beta_{min\{L_j\}j}^{(Rx)}, \ldots, \beta_{N_{B\_SS}N_B}^{(Rx)}\}}{H_{A \to B} C_{A,Tx}}.$$

Hence, there is no distortion between the AS training phase and the data transmission phase at STA B. These correction coefficients are applied in both the AS training phase and the data transmission phase, and is equivalent to replacing the ones in $F_B$ or $T_B(m)$ by the corresponding correction coefficients.

The above calculations can be repeated $N_{A\_SS}$ times, with $n_A=1 \ldots N_{A\_SS}$. The resultant $N_{A\_SS}$ sets of correction coefficients can be averaged over a time period to reduce the impact from channel estimation errors.

When both stations perform antenna selections, their calibrations can be conducted one after the other. After the first station, either a transmit or receive station, completes calibration, the first station uses a predetermined subset of antennas each connecting to a predetermined RF chain to assist the calibration of the second station. As a result, after the defined calibration procedure(s), the equivalent complete channel matrix is:

$$\tilde{H}_{A \to B} = \frac{diag\{\beta_{11}^{(Rx)}, \ldots, \beta_{min\{L_j\}j}^{(Rx)}, \ldots, \beta_{N_{B\_SS}N_B}^{(Rx)}\}}{H_{A \to B} \cdot diag\{\alpha_{11}^{(Tx)}, \ldots, \alpha_{min\{L_i\}i}^{(Tx)}, \alpha_{N_{A\_SS}N_A}^{(Tx)}\}}$$

which always contains fixed transmit and receive RF responses. Then, antenna selection training can be done in the conventional way without distortions. Only M training frames are required in each AS training phase, in which the training signals are transmitted from and/or received by antenna subsets exclusive with each other.

The above transmit or receive AS calibration procedure can also be conducted in a normal transmit/receive AS training phase, in which multiple consecutive AS training frames are transmitted from, or received by disjointed antenna subsets without considering RF imbalance. One example is the AS training scheme described in PCT Patent Application number PCT/US2005/042358, "Method for Selecting Antennas and Beams in MIMO Wireless LANs," filed in the U.S. Receiving Office by Gu et al. on Nov. 21, 2005 and incorporated herein by reference. To do so, the number of the consecutive training frames is modified to be equal to that required for calibration calculation. For example, if $N_B = N_{B\_SS}$, with the RF chain/antenna connection constraints of Equation (1) for transmit AS calibration, this number is $N_A - N_{A\_SS}$, instead of $$\left\lceil \frac{N_A}{N_{A\_SS}} \right\rceil.$$

In the case of transmit AS calibration, STA A in FIG. 3 sends $N_A - N_{A\_SS} + 1$ calibration training frames from the antenna subsets with the RF chain connections according to expression (1). STA B treats these frames as normal AS training frames, i.e., STA B estimates subchannel matrices from them and feeds the complete channel matrices back. Finally STA A calculates the transmit correction coefficients.

In the case of receive AS calibration, STA B in FIG. 4 informs STA A of the required number of calibration training frames by a normal AS training request. STA A then responds by sending the corresponding number of AS training frames with no knowledge of whether these training frames are used for normal receive AS training or for receive AS calibration. STA B receives these frames by the antenna subsets with the RF chain connections according to expression (2), and estimates the subchannel matrices. Finally, STA B determines the receive correction coefficients.

In such a way, the calibration procedure does not introduce a new signaling protocol.

Variations

The above processes can be applied to the cases where the system is frequency-selective, such as orthogonal frequency division multiplexing (OFDM) networks. In OFDM networks, the above training or calibration procedures are conducted for each subcarrier, or in each group of subcarriers.

In the case that each selected antenna subset is connected to the RF chains with predetermined ordering, the AS training process has more training frames in each AS training phase to estimate the subchannel matrix corresponding to each possible RF chain and antenna connection. The calibration procedure also sends sufficient training frames to compensate for each possible connection, e.g., if any RF chain can connect to any antenna, in the calibration of the transmitter at STA A, $L_i = \{1, 2, \ldots, N_{A\_SS}\}$, $\forall i$, and therefore $$\alpha_{2i}^{(Tx)} \ldots \alpha_{N_{A\_SS}i}^{(Tx)}$$

all need to be corrected so that the connection of any RF chain with antenna i always leads to a transmit RF response $\alpha_{li}^{(Tx)}$.

In the calibration procedures, the compensation for the RF chains connected to a particular antenna can also be applied with respect to a coefficient other than $\alpha_{min\{L_i\}i}^{(Rx)}$ or $\beta_{min\{L_j\}j}^{(Rx)}$. Any calibration procedure by which any transmit or receiver antenna brings a fixed RF response to the equivalent channel can be used.

The calibration procedure is based on the fact that different RF chains and antenna connections, i.e., switch positions, lead to different amplitude and phase responses. On the other hand, if the switch does not introduce any distortions depending on its positions, i.e., for any particular RF chain its connections to different antennas result in substantially identical RF responses, i.e., all antennas have similar matching properties with the RF chain, then the calibration procedure can be simplified.

Specifically, this is so because the RF imbalance is caused only by different responses of the RF chains. If the connection ordering constraint described above is applied or not, then it is sufficient to calibrate every RF chain only once: in the first training frame connect the first RF chain to antenna i, then connect the second RF chain to antenna i for transmitting or receiving the second training frame, . . . , connect the last RF chain to the same antenna in the last training frame.

Finally, $$\alpha_{1i}^{(Tx)} \ldots \alpha_{N_{A\_SS}i}^{(Tx)}$$

are compensated with respect to one fixed value at the transmitter after feeding back all the measured subchannel matrices, each with a single transmit antenna, or, $$\beta_{1i}^{(Rx)} \ldots \beta_{N_{B\_SS}i}^{(Rx)}$$

are directly compensated with respect to one fixed value at the receiver, based on all the measured subchannel matrices, each with a single receive antenna. In this scenario, the RF imbalance problem is caused only by the difference among RF chains, the compensated RF chains, with antenna i, also lead to no distortion when connected to all the other antennas.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for selecting antennas in a multiple-input, multiple-output wireless communications network including a plurality of stations, each station including a set of transmit RF chains and a set of receive RF chains, wherein each RF chain is connectable to a set of antennas, comprising the steps of:

transmitting, from a first station to a second station during training, a training frame for each possible subset of the set of antennas, and wherein the set of transmit RF chains are connected to the subset of antennas according to a connection mapping rule while transmitting each training frame;

estimating, in the second station, a subchannel matrix for each frame;

feeding back, from the second station to the first station, the subchannel matrix for each frame;

determining, in the first station, radio frequency (RF) imbalance transmit correction coefficients based on the subchannel matrices fed back by the second station, wherein the first station A has the set of $N_A$ antennas with $N_{A\_SS}$ transmit RF chains, and the second station B has the set of $N_B$ antennas with $N_{B\_SS}$ receive RF chains, and wherein the RF imbalance receive correction coefficients are determined as $$\tilde{H}'_{A \to B}(1) = \begin{bmatrix} \tilde{h}^{(11)}_{A \to B,11} & \tilde{h}^{(22)}_{A \to B,12} & \cdots & \tilde{h}^{(N_{A\_SS}N_{A\_SS})}_{A \to B,1N_{A\_SS}} \\ \tilde{h}^{(11)}_{A \to B,21} & \tilde{h}^{(22)}_{A \to B,22} & \cdots & \tilde{h}^{(N_{A\_SS}N_{A\_SS})}_{A \to B,2N_{A\_SS}} \\ \vdots & \vdots & \ddots & \vdots \\ \tilde{h}^{(11)}_{A \to B,N_{B\_SS}1} & \tilde{h}^{(22)}_{A \to B,N_{B\_SS}2} & \cdots & \tilde{h}^{(N_{A\_SS}N_{A\_SS})}_{A \to B,N_{B\_SS}N_{A\_SS}} \end{bmatrix},$$

where $$\tilde{h}^{(li)}_{A \to B,n_B i} = \beta^{(Rx)}_{l_B n_B} h_{A \to B,n_B i} \alpha^{(Tx)}_{li}$$

represents an equivalent channel involving all RF responses, and $h_{A \to B,n_B i}$ is an actual physical channel coefficient from transmit antenna i to receive antenna $n_B$ connected to receive RF chain $l_B$, and $\beta^{(Rx)}_{l_B n_B}$ is a corresponding receive RF response at the second station B, and $\alpha^{(Tx)}_{li}$ is a transmit RF response at the first station A with a connection of transmit antenna i and transmit RF chain l; and multiplying a baseband stream transmitted by selected transmit antennas at the first station by the RF imbalance transmit correction coefficients.

2. The method of claim 1, further comprising:

determining, in the second station, RF imbalance receive correction coefficients based on the subchannel matrices estimated by the second station; and multiplying the baseband stream received by selected receive antennas at the second station by the RF imbalance receive correction coefficients.

3. The method of claim 1, further comprising:

transmitting, from the second station to the first station, a calibration training request.

4. The method of claim 1, further comprising:

averaging the RF imbalance transmit correction coefficients over a time period.

5. The method of claim 2, further comprising:

averaging the RF imbalance receive correction coefficients over a time period.

6. The method of claim 1, further comprising:

performing a calibration procedure to reduce an RF imbalance at the first station.

7. The method of claim 1, in which the RF chains have RF chain indices and the antennas have antenna indices, and a RF chain with smaller RF chain index always connects to an antenna with smaller antenna index.

8. The method of claim 1, further comprising:

correcting an RF imbalance using the RF imbalance transmit correction coefficients.

9. The method of claim 8, wherein the selected antennas are connected to different RF chains during data transmission and the training to cause the RF imbalance.

* * * * *